(12) United States Patent
Blok

(10) Patent No.: US 11,608,240 B2
(45) Date of Patent: Mar. 21, 2023

(54) SYSTEM, APPARATUS, AND METHOD FOR UNWINDING A ROLL

(71) Applicant: Global Film Source LLC, Edison, NJ (US)

(72) Inventor: Johannes Blok, Buffalo, NY (US)

(73) Assignee: GLOBAL FILM SOURCE LLC, Edison, NJ (US)

( * ) Notice: Subject to any disclaimer, the term of this patent is extended or adjusted under 35 U.S.C. 154(b) by 8 days.

(21) Appl. No.: 17/333,195

(22) Filed: May 28, 2021

(65) Prior Publication Data

US 2021/0371225 A1   Dec. 2, 2021

Related U.S. Application Data

(60) Provisional application No. 63/033,160, filed on Jun. 1, 2020.

(51) Int. Cl.
  *B65H 16/00* (2006.01)
  *C09J 7/20* (2018.01)
  *C09J 7/40* (2018.01)

(52) U.S. Cl.
  CPC .............. *B65H 16/00* (2013.01); *C09J 7/20* (2018.01); *C09J 7/40* (2018.01); *B65H 2701/377* (2013.01); *C09J 2203/31* (2013.01); *C09J 2301/16* (2020.08)

(58) Field of Classification Search
  CPC .............. B65H 16/00; B65H 2701/377; B65H 2301/521; B65H 2701/1722; B65H 2701/1922; B65H 18/28; C09J 7/20; C09J 7/40; C09J 2203/31; C09J 2301/16
  See application file for complete search history.

(56) References Cited

U.S. PATENT DOCUMENTS

| | | | |
|---|---|---|---|
| 9,162,632 B2 * | 10/2015 | Tsuzuki | C09J 7/20 |
| 2003/0154569 A1 * | 8/2003 | McKay | A47L 25/005 |
| | | | 428/40.1 |

FOREIGN PATENT DOCUMENTS

| | | | | |
|---|---|---|---|---|
| CN | 102037614 A | * | 4/2011 | B65H 75/28 |
| WO | WO-2020260896 A1 | * | 12/2020 | C09J 7/30 |

OTHER PUBLICATIONS

Machine Translation of CN 102037614 A. (Year: 2011).*

* cited by examiner

*Primary Examiner* — Patricia L. Nordmeyer
(74) *Attorney, Agent, or Firm* — Keefe IP Law, PLLC

(57) ABSTRACT

An assembly is disclosed. The assembly has an adhesive layer, a protective film layer that is fused to a first side of the adhesive layer along a first length, and a cover layer that is fused to a second side of the adhesive layer along a second length. The first length is longer than the second length. The adhesive layer is wound in a roll. The second side of the adhesive layer faces outwardly from a center of the roll.

19 Claims, 6 Drawing Sheets

SYSTEM, APPARATUS, AND METHOD FOR UNWINDING A ROLL

RELATED APPLICATIONS

This application claims the benefit of U.S. Provisional Patent Application No. 63/033,160 filed on Jun. 1, 2020, which is hereby incorporated by reference in its entirety.

TECHNICAL FIELD

The present disclosure generally relates to a system, apparatus, and method for unwinding, and more particularly to a system, apparatus, and method for unwinding a roll.

BACKGROUND

Surface protection films and tapes are typically used to protect surfaces from dirt, scratches, and other damage or to mask off certain areas. With these types of products, it is often difficult to identify a beginning of a roll to be able to begin unwinding it. Therefore in conventional systems, a start of a roll is often indicated by a marker strip that is located along the edge of the film.

However, marker strips are often ineffective in identifying the start of the roll. For example, even with a marker strip present, starting a new roll is usually a source of frustration for users of conventional systems as it is not easy to peel up an edge of the product to begin using the roll. Also for example, the marking strip is often mistakenly offset from an edge of the film of a product. Further for example in conventional carpet film systems, identifying and peeling up an edge can be frustrating because carpet film is often particularly sticky.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to an assembly. The assembly includes an adhesive layer, a protective film layer that is fused to a first side of the adhesive layer along a first length, and a cover layer that is fused to a second side of the adhesive layer along a second length. The first length is longer than the second length. The adhesive layer is wound in a roll. The second side of the adhesive layer faces outwardly from a center of the roll.

In another aspect, the present disclosure is directed to a method. The method includes providing a protective film layer that is fused to a first side of an adhesive layer along a first length, providing a cover layer that is fused to a second side of the adhesive layer along a second length that is less than the first length, and providing the protective film layer, the cover layer, and the adhesive layer in a wound roll in which the second side of the adhesive layer faces outwardly from a center of the roll and the cover layer is disposed at an exterior end portion of the roll. The method also includes unrolling the roll starting with the exterior end portion of the roll, and exposing an adhesive surface of the adhesive layer at the second side of the adhesive layer after the first length of the cover layer is unrolled from the roll.

DETAILED DESCRIPTION AND INDUSTRIAL APPLICABILITY

FIGS. 1-5 illustrate an exemplary embodiment of the exemplary disclosed system, apparatus, and method. Assembly 100 may be an assembly for protecting surfaces such as wood (e.g., hardwood floors), linoleum, tile floors, carpets, rugs, countertops, furniture, containers (e.g., boxes), walls, doors, windows, and/or any other suitable surfaces (e.g., horizontal, vertical, and/or angled surfaces) during their use, during construction, or during any other desired activity or time period. The exemplary disclosed system, apparatus, and method may also be used in taping applications such as packing tape and masking tape applications.

Figure 1:
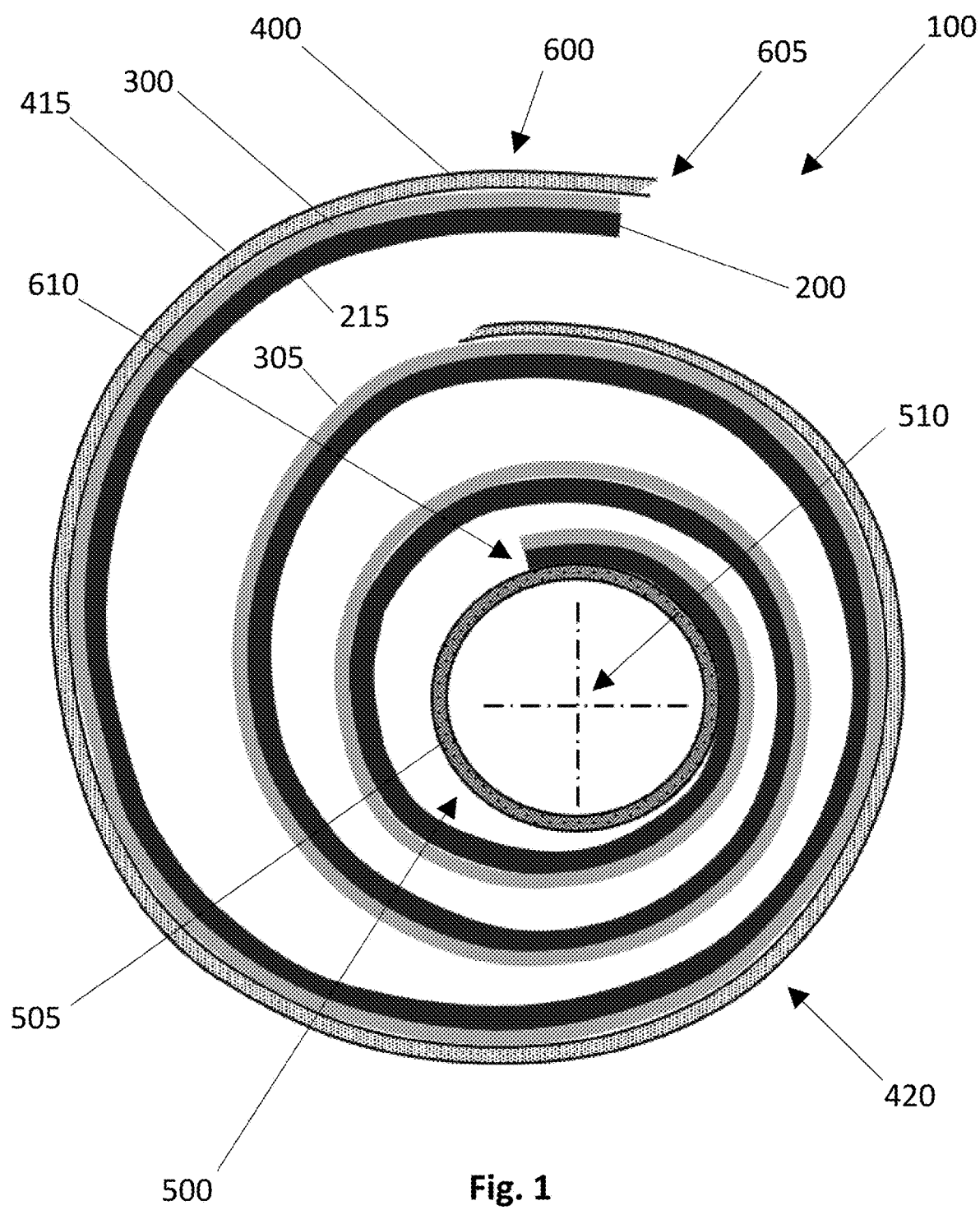
FIG. 1 is a cross-sectional view of at least some exemplary embodiments of the present invention.

As illustrated in FIG. 1, assembly 100 may include a film assembly 200, an adhesive layer 300, a cover assembly 400, and a core assembly 500. Adhesive layer 300 may be disposed between and may adhere to portions of film assembly 200 and cover assembly 400. Film assembly 200, adhesive layer 300, and cover assembly 400 may form a roll 600 that may be wrapped or wound around core assembly 500.

Figure 3:
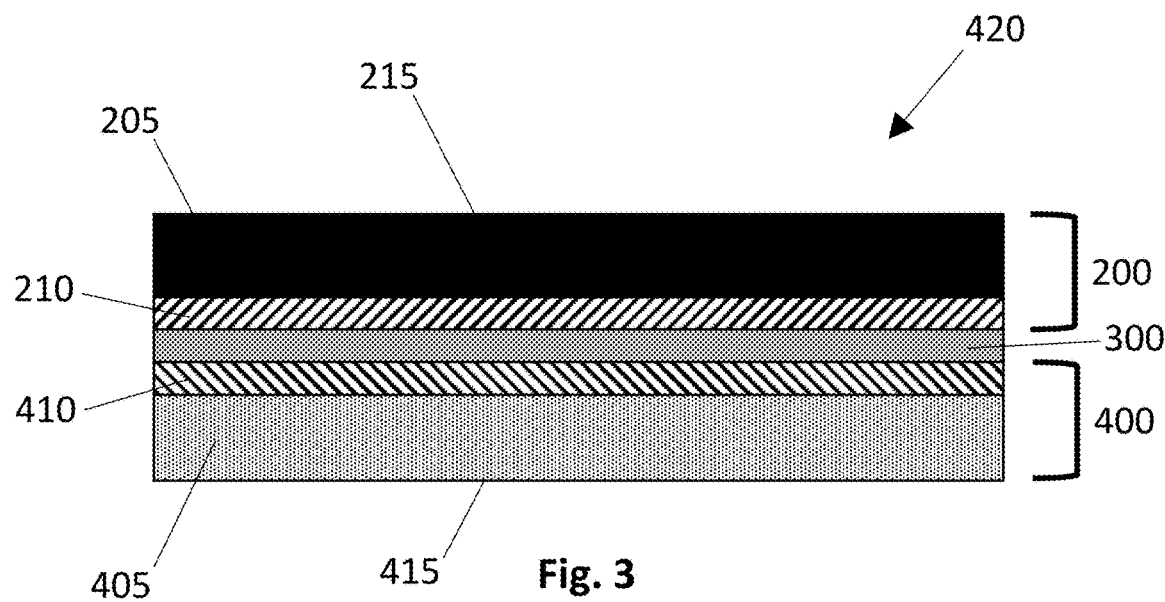
FIG. 3 is a cross-sectional view of at least some exemplary embodiments of the present invention.

As illustrated in FIGS. 1 and 3, film assembly 200 may include a film layer 205 and a film surface portion 210. Film surface portion 210 may form a treated surface portion of film layer 205.

Film layer 205 may be any suitable layer for protecting a surface. Film layer 205 may be formed from any suitable fabric, plastic material, paper, composite material, and/or any other suitable material for protecting a surface. For example, film layer 205 may be formed from polyethylene, polypropylene, vinyl, and/or polyvinyl material. Film layer 205 may be formed from any suitable natural or synthetic fiber material. For example, film layer 205 may be formed from cotton, polyester, nylon, acrylic, rayon, blends of these exemplary materials, and/or any other suitable fiber fabric or material.

As illustrated in FIGS. 1 and 3, film layer 205 may include a surface 215 that may be an untreated surface. For example, surface 215 may not adhere to or may not be easily adherable to adhesive layer 300. For example, surface 215 may be a non-adhesive surface. Film surface portion 210 may be disposed at an opposite or reverse side of film layer 205 as surface 215.

Film surface portion 210 may include material disposed on the surface of film layer 205 and/or a portion of film layer 205 that has been infused with, impregnated with, infiltrated with, covered with, and/or contains material of film surface portion 210. For example, film surface portion 210 may be a surface portion of film layer 205 that has been exposed to or undergone a treatment for enhancing or increasing adhesion. Film surface portion 210 may be treated to increase adhesion with adhesive layer 300. The exemplary treatment may be an adhesion-enhancing treatment. The exemplary treatment may be a plasma treatment (e.g., in-line plasma treatment), a corona treatment, a flame treatment (e.g., pyrosil flame treatment), and/or any other suitable treatment for enhancing adhesion and bonding. Film surface portion 210 may thereby adhere (e.g., permanently adhere) film layer 205 to adhesive layer 300 for example as illustrated in FIGS. 1 and 3. Film surface portion 210 may thereby provide a fused, fixed, or substantially permanent attachment between film layer 205 and adhesive layer 300 so that film layer 205 does not detach or separate from adhesive layer 300 during use of assembly 100 (e.g., when an opposite side of adhesive layer 300 is being removably adhered to a surface to be protected for example as described herein).

As illustrated in FIGS. 1 and 3, cover assembly 400 may include a cover layer 405 and a cover surface portion 410. Cover surface portion 410 may form a treated surface portion of cover layer 405.

Cover layer 405 may be formed from any suitable material for providing a cover wrapped around assembly 100 (e.g., roll 600) such as, for example, material similar to film layer 205. As illustrated in FIGS. 1 and 3, cover layer 405 may include a surface 415 that may be an untreated surface. For example, surface 415 may not adhere to or may not be easily adherable to adhesive layer 300. For example, surface 415 may be a non-adhesive surface. Cover surface portion 410 may be disposed at an opposite or reverse side of cover layer 405 as surface 415.

Cover surface portion 410 may form a treated surface portion similar to as described above regarding film surface portion 210. Cover surface portion 410 may thereby adhere (e.g., permanently adhere) cover layer 405 to adhesive layer 300 for example as illustrated in FIGS. 1 and 3. Cover surface portion 410 may thereby provide a fixed or substantially permanent attachment between cover layer 405 and adhesive layer 300 so that cover layer 405 does not detach or separate from adhesive layer 300 during use of assembly 100.

Figure 4:
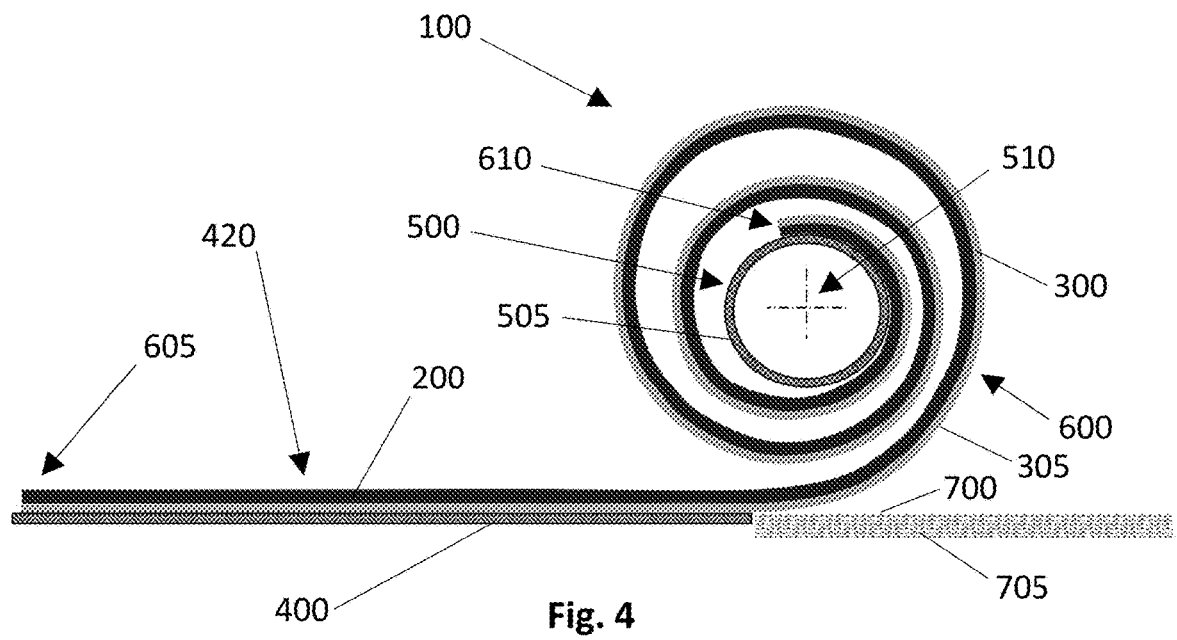
FIG. 4 is a cross-sectional view of at least some exemplary embodiments of the present invention.
Figure 5:
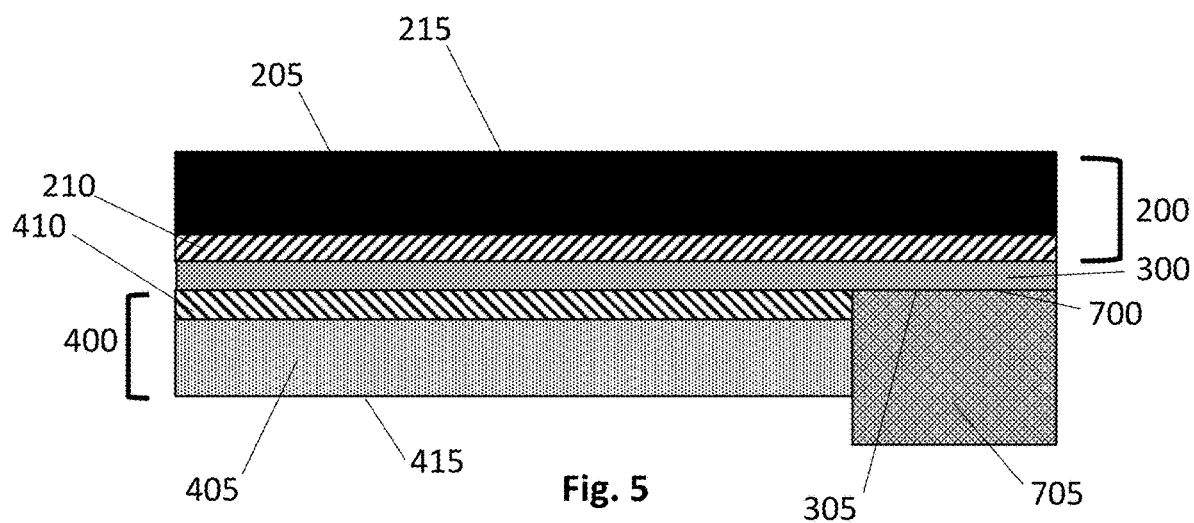
FIG. 5 is a cross-sectional view of at least some exemplary embodiments of the present invention.

Adhesive layer 300 may be formed from any suitable adhesive material for adhering (e.g., removably adhering) to a surface to be protected and also for substantially permanently adhering to film surface portion 210 and/or cover surface portion 410. For example, adhesive layer 300 may be formed from acrylic adhesive (e.g., water-based or solvent-based acrylic adhesive), natural adhesive such as rubber adhesive (e.g., water-based or solvent-based rubber adhesive), pressure-sensitive adhesive (e.g., acrylic-based pressure-sensitive adhesive), hotmelt adhesive, and/or any other suitable adhesive. For example as illustrated in FIGS. 4 and 5, adhesive layer 300 may thereby be adhered (e.g., removably adhered or removably attached, or in some cases permanently attached) to an exemplary disclosed surface to be protected (e.g., as described herein) such as a surface 700 (e.g., of any suitable object 705 including a surface 700 to be protected) and may be adhered (e.g., substantially permanently adhered, substantially permanently attached, or fused) to film surface portion 210 and/or cover surface portion 410. Object 705 including surface 700 may be for example any of the exemplary disclosed applications (e.g., floors or carpet) described herein.

Figure 2:
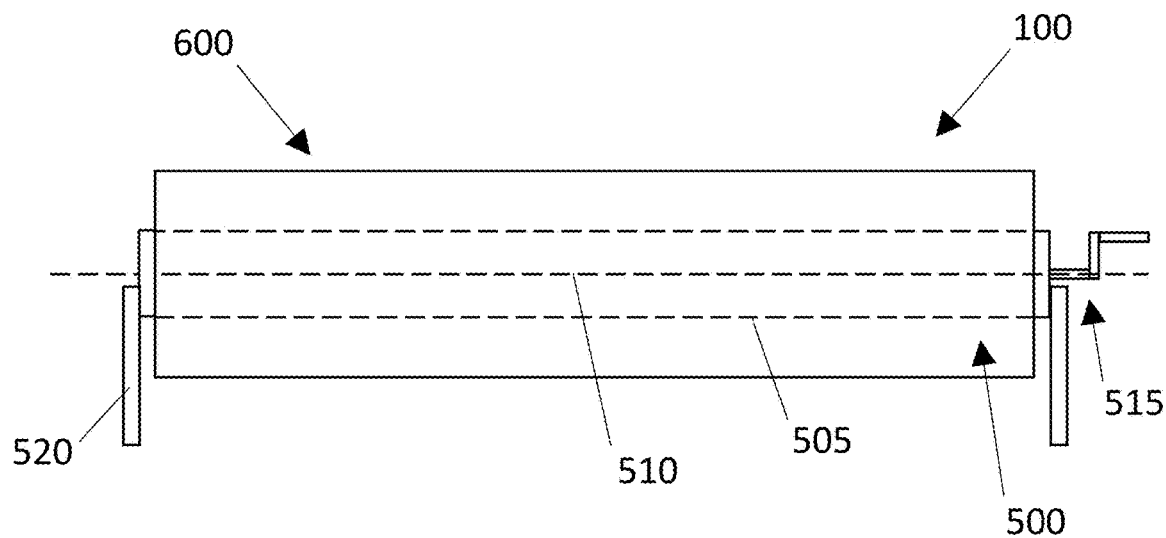
FIG. 2 is a side view of at least some exemplary embodiments of the present invention.

As illustrated in FIGS. 1 and 2, core assembly 500 may include a core member 505. In at least some exemplary embodiments, core assembly 500 may include an actuating assembly 515 configured to actuate core member 505.

Core member 505 may be any suitable member about which roll 600 (e.g., including film assembly 200, adhesive layer 300, and cover assembly 400) may be wound, wrapped, unwound, or unwrapped. For example, roll 600 may be loosely or tightly wrapped around core member 505. Core member 505 may be formed from any suitable material for providing a member for winding and unwinding roll 600 such as, for example, a solid or hollow structural member. Core member 505 may be a spool, a tube, or a cylinder. Core member 505 may be formed from any suitable structural material such as, for example, cardboard, wood, plastic, metal, or any other suitable structural material.

Actuating assembly 515 may be any suitable assembly for actuating core member 505. For example, actuating assembly 515 may be any suitable assembly for rotating core member 505 about a central axis 510. Actuating assembly 515 may include a handle assembly for manually winding and unwinding roll 600, a motor for mechanically winding and unwinding roll 600, and/or any other suitable mechanical or electro-mechanical assembly for winding and unwinding roll 600 around core member 505. Actuating assembly 515 may also include support members 520 that may be any suitable structural members (e.g., formed from material similar to core member 505) such as struts for supporting core member 505 during winding and unwinding of roll 600. In at least some exemplary embodiments, actuating assembly 515 may be used to rewind (e.g., automatically rewind) roll 600 back around core member 505 (e.g., via motorized actuation or rotation of core member 505).

Figure 7:
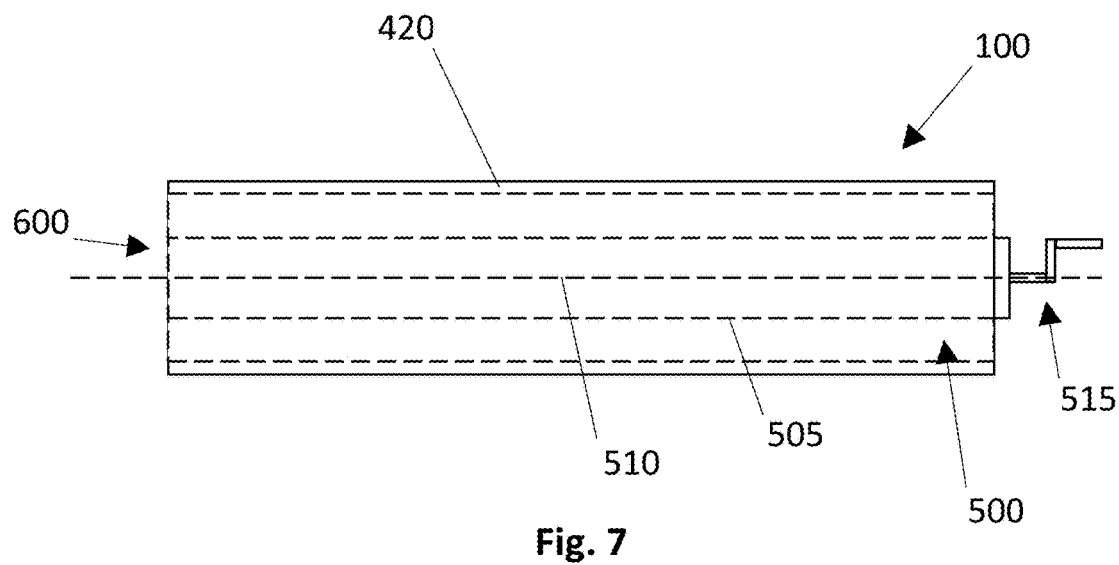
FIG. 7 is a side view of at least some exemplary embodiments of the present invention.

As illustrated in FIGS. 1 and 4, roll 600 may include an end portion 610 that may contact and/or be attached to core member 505 and a beginning portion 605 that may be disposed at an exterior or an outside of roll 600. As illustrated in FIG. 7, roll 600 may be wrapped or rolled tightly around core member 505. In at least some exemplary embodiments, beginning portion 605 may be a part of a cover 420 as further described below. Roll 600 may have any suitable width for applications for protecting a surface. For example, roll 600 may have a width of between about 1 inch and about 6 inches, between about 1 inch and about 12 inches, between about 0.5 feet and about 4 feet, between about 1 foot and about 12 feet (e.g., or more), or any other suitable width.

As illustrated in FIGS. 1, 3, and 4, cover 420 may include a portion of adhesive layer 300 that may be adhered (e.g., substantially permanently adhered or fused) to a portion of film assembly 200 (e.g., to a portion of film layer 205) via film surface portion 210 and also to cover assembly 400 (e.g., to cover layer 405) via cover surface portion 410. Cover 420 may also include, as exterior surfaces, surface 215 and surface 415 as illustrated in FIG. 3. In at least some exemplary embodiments, cover 420 may thereby have untreated and non-adhesive exterior surfaces (e.g., surfaces 215 and 415). As illustrated in FIGS. 1, 7, 8, and 9, cover 420 may form an exterior (e.g., untreated and non-adhesive) exterior to roll 600 that may more than completely encircle an exterior of roll 600 so that an end cover portion 430 may overlap a beginning cover portion 425 of cover 420.

Figure 6:
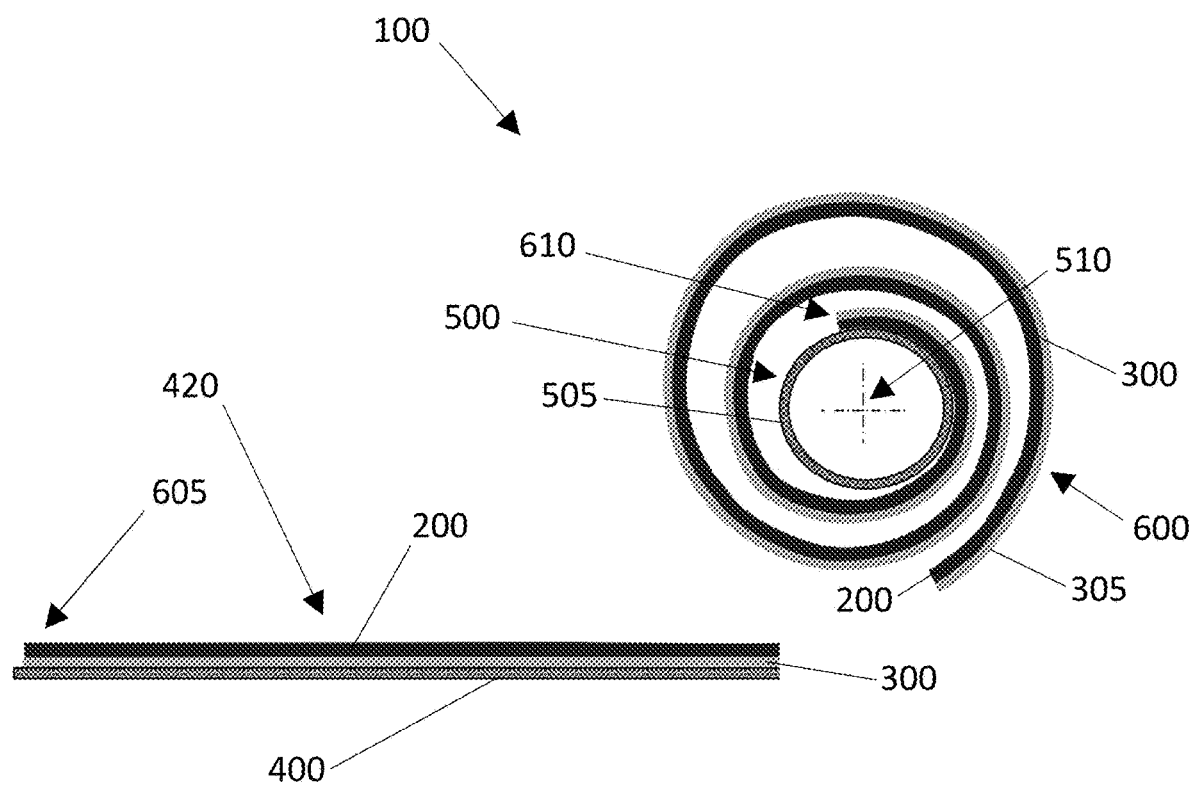
FIG. 6 is a cross-sectional view of at least some exemplary embodiments of the present invention.
Figure 8:
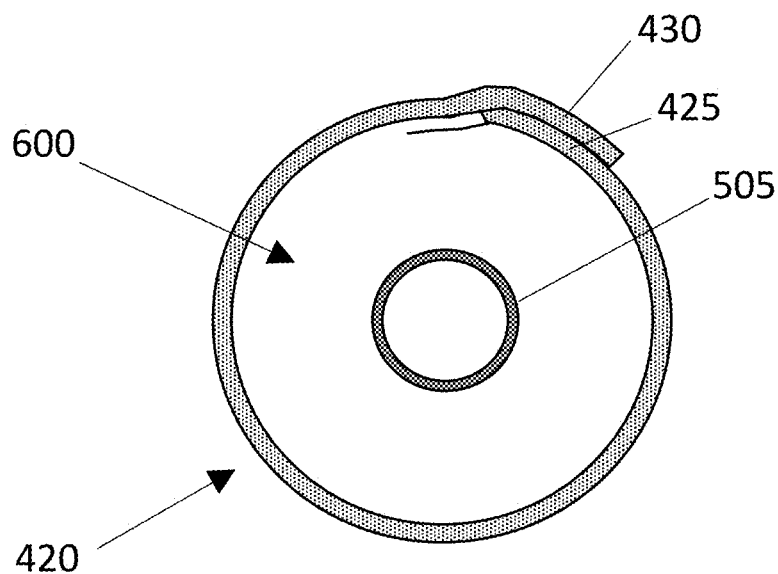
FIG. 8 is a cross-sectional view of at least some exemplary embodiments of the present invention.
Figure 9:
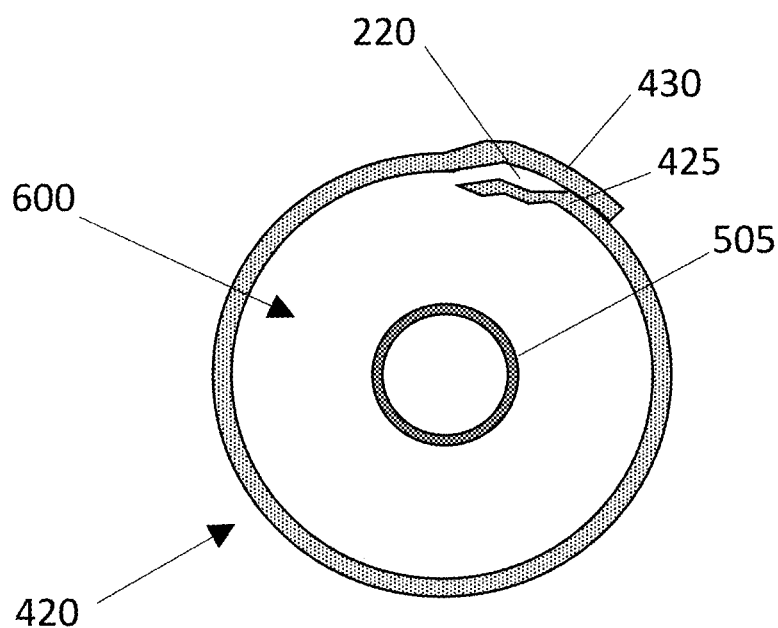
FIG. 9 is a cross-sectional view of at least some exemplary embodiments of the present invention.

Cover 420 may be an integral portion of or attached to roll 600 as illustrated in FIGS. 1 and 4. Cover 420 may also be cut or detached from roll 600 as illustrated in FIG. 6. Cover 420 may also be removably attachable to roll 600 (e.g., via relatively easily detachable perforation lines and/or any suitable type of fastener). Whether still integral with or attached to roll 600, or cut or detached from roll 600, cover 420 may be used as illustrated in FIG. 8 to cover (e.g., to be wrapped around) roll 600 and to provide a non-adhesive exterior surface to roll 600 as illustrated in FIGS. 8 and 9. Roll 600 may thereby be more easily stored and transported with a non-adhesive exterior surface as illustrated in FIGS. 8 and 9. Also because the exterior surface (e.g., surface 415) of roll 600 may be non-adhesive, it may be easier for a user to identify an edge of cover 420, remove cover 420, and to begin using (e.g., unwrapping and unwinding) roll 600. For example when cover 420 is attached to roll 600, a user may be able to begin using roll 600 immediately because the attachment of cover 420 to roll 600 may pull adhesive layer 300 from surface 215 (e.g., untreated or non-adhesive surface) of adjacent film assembly 200, and roll 600 may be freely unwound (e.g., unrolled or unwrapped). Cover 420 may also be a separate non-adhesive layer that may be disposed on (e.g., wrapped around) roll 600 as illustrated in FIG. 9.

FIG. 9 illustrates another exemplary embodiment in which an end film portion 220 (e.g., an end portion of film assembly 200 disposed at an exterior of roll 600) is disposed between end cover portion 430 and beginning cover portion 425 of cover 420. For example when cover 420 has been separated (e.g., cut or detached) from roll 600, cover 420 may be disposed between end film portion 220 and the portion of the adjacent layer of film assembly 200 that end film portion 220 overlaps so that end film portion 220 is disposed between end cover portion 430 and beginning cover portion 425 as illustrated in FIG. 9.

As described above, both sides (e.g., surface 215 and surface 415) of cover 420 may be untreated and non-adhesive, while the remaining portion of roll 600 may include one untreated and non-adhesive surface (e.g., surface 215) and an adhesive surface (e.g., an adhesive surface 305 of adhesive layer 300) as illustrated in FIGS. 1, 4, 5, and 6. As illustrated in FIG. 5, adhesive surface 305 may be removably adhered to a surface to be protected such as surface 700 during a use of assembly 100. Based on adhesive surface 305 being configured to face outward toward an exterior of wound roll 600, assembly 100 may provide a reverse-wound film assembly 200 that may be immediately and easily applied to a surface to be protected such as surface 700 during a use of assembly 100.

The exemplary disclosed system, apparatus, and method may be used in any suitable application for protecting a surface. For example, the exemplary disclosed system, apparatus, and method may be used for protecting hard floor surfaces such as wood (e.g., hardwood), linoleum, tile floors, or any other suitable hard flooring. Also for example, the exemplary disclosed system, apparatus, and method may be used for protecting carpets or rugs. The exemplary disclosed system, apparatus, and method may also be used for protecting countertops, furniture, containers (e.g., boxes), or any other suitable objects. The exemplary disclosed system, apparatus, and method may also be used for protecting walls, doors, windows, and/or any other suitable surfaces (e.g., vertical surfaces). The exemplary disclosed system, apparatus, and method may further be used for any suitable taping application such as packing tape or masking tape. The exemplary disclosed system, apparatus, and method may be used in any suitable reverse-wound product including an adhesive side.

Figure 10:
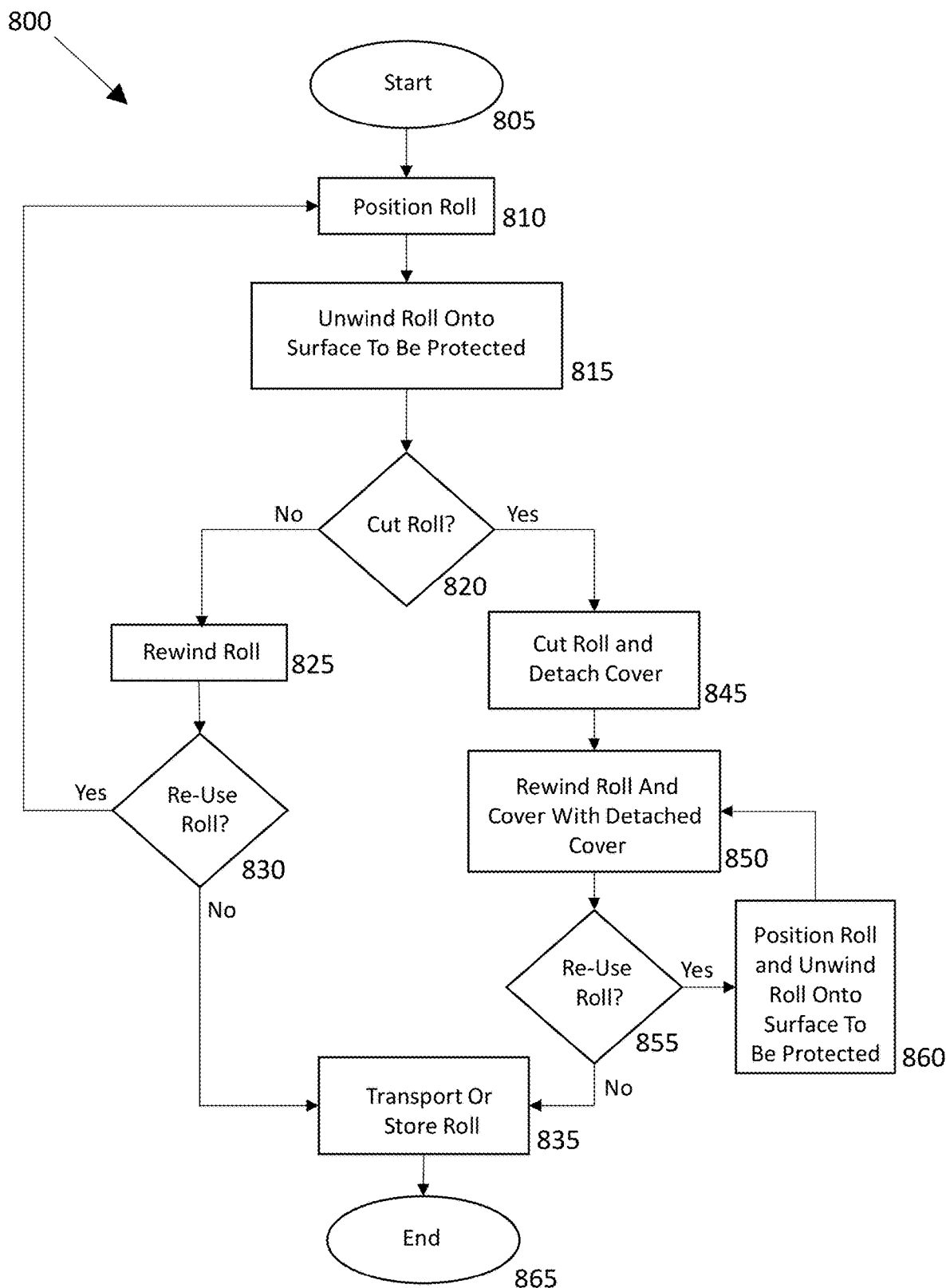
FIG. 10 illustrates an exemplary process of at least some exemplary embodiments of the present disclosure.

FIG. 10 illustrates an exemplary operation for using the exemplary disclosed assembly 100. Process 800 begins at step 805. At step 810, a user may position assembly 100 at a surface to be protected (e.g., surface 700). For example as illustrated in FIGS. 4 and 5, assembly 100 may be positioned so that cover 420 ends adjacent to surface 700 and a beginning portion of adhesive surface 305 of roll 600 may be aligned with a beginning portion of surface 700. Film assembly 200 fused to adhesive layer 300 may then be adhered (e.g., removably adhered) to surface 700.

At step 815, roll 600 may be unwound onto surface 700. Assembly 100 may be reverse-wound for example as described above so that roll 600 may be easily unrolled and automatically adhered to surface 700 based on adhesive surface 305 facing outwardly from core member 505 (e.g., sticky side facing out). For example, assembly 100 may include roll 600 that is reverse-wound to provide a film (e.g., film assembly 200 fused to adhesive layer 300) that may be automatically applied to a surface (e.g., surface 700) as roll 600 is being unrolled. Roll 600 may be unrolled without the user kneeling or bending over, for example based on the user using his or her feet (e.g., kicking roll 600 forward). Also for example, roll 600 may be unrolled by a user using actuating assembly 515 as described above. Roll 600 may thereby be applied to surface 700 so that film assembly 200 that may be substantially permanently attached (e.g., fused or substantially permanently adhered) to adhesive layer 300 may be adhered (e.g., removably adhered) to surface 700 via adhesive surface 305.

At step 820, a user may determine whether or not to cut roll 600. For example, a user may decide based on a nature of a project in which assembly 100 is used to cut off or detach a portion of roll 600 (e.g., to leave a portion of film assembly 200 that may be fused to adhesive layer 300 attached to surface 700 via adhesive surface 305). For example, a user may cut roll 600 to leave a portion of roll 600 adhered to surface 700 and then to use a remaining portion of roll 600 at another location or to store a remaining portion of roll 600 (e.g., or to cut roll 600 for any other desired reason such as due to damage or wear to a used portion of roll 600). In cutting roll 600, a user may also cut or detach cover 420 from the remaining portion of roll 600 for re-use for example as described herein.

If a user determines at step 820 not to cut roll 600, process 800 proceeds to step 825. When use of roll 600 is finished, the user may remove adhesive surface 305 from surface 700 and may rewind or re-roll roll 600. The user may manually and/or automatically rewind roll 600 using actuating assembly 515 for example as described herein. For example, the user may completely rewind or re-roll an entire length of roll 600 including cover 420. As cover 420 may still be attached to roll 600, cover 420 may automatically entirely wrap around an exterior of roll 600 when it is re-rolled so that substantially no portion of adhesive surface 305 is exposed (e.g., as illustrated in FIG. 8). Because surfaces 215 and 415 of cover 420 may be untreated and non-adhesive, surfaces 215 and 415 may not fuse or permanently adhere or attach to adhesive surface 305. For example, adhesive surface 305 may removably adhere to surface 415 of cover 420 to facilitate providing the rolled or wound configuration illustrated in FIG. 8. The user may determine at step 830 whether or not to re-use assembly 100 at a given location or during a given project or activity. If the user desires to re-use assembly 100, process 800 returns to step 810 so that the user may position rewound or re-rolled assembly 100 at a new position and again follow the exemplary steps of process 800. If the user does not desire to re-use assembly 100, process 800 proceeds to step 835, at which the user may transport, store, or perform any other desired activity with rewound or re-rolled assembly 100. Process 800 ends at step 865.

If a user determines at step 820 to cut roll 600, process 800 proceeds to step 845. A user may cut roll 600 to leave a portion of roll 600 adhered to surface 700. The user may cut roll 600 using any suitable technique such as, for example, using a knife, a razor blade, a cutting mechanism of actuating assembly 515, and/or any other suitable cutting technique. The user may cut or detach cover 420 from the remaining portion of roll 600. Process 800 proceeds to step 850.

At step 850, after cutting off a portion of roll 600 (e.g., including cover 420 that may be attached at beginning portion 605 of roll 600), the user may rewind or re-roll roll 600 for example as described herein when a given project or activity is completed. When roll 600 is rewound or re-rolled, cover 420 may be disposed between end film portion 220 and the portion of the adjacent layer of film assembly 200 that end film portion 220 overlaps so that end film portion 220 may be disposed between end cover portion 430 and beginning cover portion 425 as illustrated in FIG. 9. For example, after roll 600 is cut, cover 420 may be disposed (e.g., started) just behind end film portion 220 and wound around the outside of roll 600 with an overlap (e.g., a small or a little overlap) past the end of roll 600 (e.g., at which point, if desired, cover member 420 may be cut to reduce the length of overlap). For example, a marking strip may not be involved, as the end of cover member 420 may not adhere to the portion of cover member 420 over which it overlaps (e.g., because surfaces 215 and 415 of cover 420 may be untreated and non-adhesive). Because surfaces 215 and 415 of cover 420 may be untreated and non-adhesive, either side of cover 420 may face roll 600 to provide a wrapped roll 600 (e.g., cover 420 may be used "inside-out" and also in its original configuration facing roll 600). Cover 420 may be repeatedly used to provide a non-adhesive cover to roll 600 to facilitate easy transport and storage.

The user may determine at step 855 whether or not to re-use assembly 100 at a given location or during a given project or activity. If the user desires to re-use assembly 100, process 800 proceeds to step 860 so that the user may position rewound or re-rolled assembly 100 at a new position (e.g., similarly to step 810), and unwind and place roll 600 on a surface 700 to be protected (e.g., similarly to step 815). Process 800 may then return to step 850. If the user does not desire to re-use assembly 100, process 800 proceeds to step 835, at which the user may transport, store, or perform any other desired activity with rewound or re-rolled assembly 100. Process 800 ends at step 865.

In at least some exemplary embodiments, because both sides (e.g., surfaces 215 and 415) of cover 420 may be untreated and non-adhesive, a user may not accidentally adhere a treated material to an adhesive surface (e.g., contact surface 305) and unintentionally create a fused attachment. This may avoid a situation in which some or all of a protective film is discarded based on the film being ruined by accidental fusion of its portions in attempting to rewind or re-roll the film.

In at least some exemplary embodiments, the exemplary disclosed system, apparatus, and method may provide an auto-start or self-start reverse-wound adhesive film and tape.

In at least some exemplary embodiments, the exemplary disclosed system, apparatus, and method may be used with a relatively high tack film such as carpet film and/or other applications that may help a user to unwind by feel (e.g., find and separate a start of a roll by feel using the exemplary disclosed cover).

In at least some exemplary embodiments, the exemplary disclosed system, apparatus, and method may be a packing tape or a masking tape application including an auto-start tape that may be started as soon as an outer wrap is removed (e.g., based on a configuration similar to FIG. 8 or 9), thereby saving time trying to identify the beginning of the roll. Also, because an outer wrap may be fused to an outer layer of a roll, the outer wrap may not be sticky, making it easier for users to load the roll on a tape dispenser.

In at least some exemplary embodiments, the exemplary disclosed assembly may include an adhesive layer (e.g., adhesive layer 300), a protective film layer (e.g., film layer 205) that is fused to a first side of the adhesive layer along a first length, and a cover layer (e.g., cover layer 405) that is fused to a second side of the adhesive layer along a second length. The first length may be longer than the second length. The adhesive layer may be wound in a roll. The second side of the adhesive layer may face outwardly from a center of the roll. A first surface of the cover layer may be fused to the second side of the adhesive layer and a second surface of the cover layer, which is opposite to the first surface, may be non-adhesive. The cover layer may be fused to the second side of the adhesive layer via an adhesion-enhancing treated surface portion of the cover layer. A first surface of the protective film layer may be fused to the first side of the adhesive layer and a second surface of the protective film layer, which is opposite to the first surface, may be non-adhesive. The protective film layer may be fused to the first side of the adhesive layer via an adhesion-enhancing treated surface portion of the protective film layer. A beginning portion of the adhesive layer may be disposed at an exterior of the roll. An end portion of the adhesive layer may be disposed at an interior of the roll near the center of the roll. The cover layer may begin at the beginning portion and may extend the second length along the second side of the adhesive layer toward the end portion. The protective film layer may begin at the beginning portion and may extend the first length along the first side of the adhesive layer, the first length equaling an entire length of the first side of the adhesive layer from the beginning portion to the end portion. The adhesive layer, the protective film layer, and the cover layer may be wrapped around a core member having a central axis at the center of the roll.

In at least some exemplary embodiments, the exemplary disclosed method may include providing a protective film layer (e.g., film layer 205) that may be fused to a first side of an adhesive layer along a first length, providing a cover layer (e.g., cover layer 405) that may be fused to a second side of the adhesive layer along a second length that may be less than the first length, and providing the protective film layer, the cover layer, and the adhesive layer in a wound roll in which the second side of the adhesive layer faces outwardly from a center of the roll and the cover layer is disposed at an exterior end portion of the roll. The exemplary disclosed method may also include unrolling the roll starting with the exterior end portion of the roll, and exposing an adhesive surface of the adhesive layer at the second side of the adhesive layer after the first length of the cover layer is unrolled from the roll. The exemplary disclosed method may further include adhering the adhesive surface to a surface to be protected while continuing to unroll the roll. The exemplary disclosed method may also include rewinding the roll and re-covering the exposed adhesive surface of the adhesive layer with a portion of the protective film layer disposed on the opposite side of the adhesive layer from the cover layer. A first surface of the cover layer may be fused to the second side of the adhesive layer and a second surface of the cover layer, which is opposite to the first surface, may be non-adhesive. The exemplary disclosed method may further include detaching the cover layer from the roll when the cover layer is unrolled. Detaching the cover layer may include detaching a portion of the adhesive layer fused to the cover layer and a portion of the protective film layer fused to the portion of the adhesive layer, the portion of the adhesive layer being disposed between the cover layer and the portion of the protective film layer. The cover layer, the portion of the adhesive layer, and the portion of the protective film layer may form a detached cover having opposite sides that are both non-adhesive. The exemplary disclosed method may further include disposing an end portion of the detached cover between an unrolled end portion of the protective film layer that may be fused to the first side of the adhesive layer and an adjacent exposed adhesive surface of the adhesive layer that may be rolled on the roll. The exemplary disclosed method may also include re-covering the exposed adhesive surface of the adhesive layer with the detached cover.

In at least some exemplary embodiments, the exemplary disclosed assembly may include an adhesive layer (e.g., adhesive layer 300), a protective film layer (e.g., film layer 205), which may include a first film surface that may be fused to a first side of the adhesive layer along a first length, and a second film surface that may be non-adhesive and that may be disposed on an opposite side of the protective film layer as the first film surface, and a cover layer, which may include a first cover surface that may be fused to a second side of the adhesive layer along a second length, and a second cover surface that may be non-adhesive and that may be disposed on an opposite side of the cover layer as the first cover surface. The first length may be longer than the second length. The adhesive layer, the protective film layer, and the cover layer may be wound in a roll. The second side of the adhesive layer may face outwardly from a center of the roll. The cover layer, a portion of the adhesive layer that may be fused to the cover layer, and a portion of the protective film layer that may be fused to the portion of the adhesive layer may form a cover having opposite exterior sides that may be non-adhesive. The opposite exterior sides of the cover that may be non-adhesive may be the second film surface and the second cover surface. A beginning portion of the assembly may be disposed at an exterior of the roll. An end portion of the assembly may be disposed at an interior of the roll near the center of the roll. The cover of the assembly may begin at the beginning portion and may extend the second length toward the end portion. The cover including the cover layer may end at a distance of the second length from the beginning portion. The protective film layer fused to the adhesive layer may continue to extend from a point at the distance of the second length from the beginning portion until reaching the end portion.

In at least some exemplary embodiments, the exemplary disclosed system, apparatus, and method may provide an efficient and effective system for identifying a beginning of a roll to be able to begin unwinding the roll without frustration and without wasting significant time in finding the beginning of the roll. The exemplary disclosed system, apparatus, and method may also provide an effective technique for identifying a beginning of a roll that does not depend on a marker strip and thereby avoids problems with misaligned marker strips. The exemplary disclosed system, apparatus, and method may further provide an effective technique for easily peeling up an end portion of a reverse-wound roll.

It will be apparent to those skilled in the art that various modifications and variations can be made to the exemplary disclosed apparatus, system, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. An assembly, comprising:
an adhesive layer;
a protective film layer that is permanently attached to a first side of the adhesive layer along a first length of the first side of the adhesive layer, the protective film layer including an exposed protective surface that is non-adhesive; and
a cover layer that is permanently attached to a second side of the adhesive layer along a second length of the second side of the adhesive layer, the cover layer including an exposed cover surface that is non-adhesive;
wherein when the adhesive layer is wound in a roll, the first length extends from an outside end portion of the roll along a plurality of layers of the adhesive layer wound around a center of the roll, and the cover layer extends the second length from the outside end portion of the roll and ends slightly beyond an outside layer of the plurality of layers, an exposed adhesive surface of the adhesive layer being exposed after the cover layer and along the plurality of layers of the adhesive layer wound around the center of the roll;
wherein the exposed adhesive surface of the adhesive layer faces outwardly from the center of the roll; and
wherein when the adhesive layer is wound in the roll, the exposed cover surface of the cover layer that is non-adhesive faces outwardly from the center of the roll, and the cover layer extends continuously along the second length to cover the exposed adhesive surface at an exterior of the roll.

2. The assembly of claim 1, wherein:
a first surface of the cover layer is permanently attached to the second side of the adhesive layer, and a second surface of the cover layer, which is opposite to the first surface, is the exposed cover surface that is non-adhesive; and
a second surface of the protective film layer, which is opposite to the exposed protective surface of the protective film layer that is non-adhesive, is permanently attached to the first side of the adhesive layer.

3. The assembly of claim 2, wherein the cover layer is permanently attached to the second side of the adhesive layer via an adhesion-enhancing treated surface portion of the first surface of the cover layer.

4. The assembly of claim 1, wherein the protective film layer is permanently attached to the first side of the adhesive layer via an adhesion-enhancing treated surface portion of the protective film layer.

5. The assembly of claim 1, wherein:
a beginning portion of the adhesive layer is disposed at the outside end portion of the roll;
an end of the adhesive layer is disposed at an interior of the roll near the center of the roll; and the cover layer begins at the beginning portion and extends the second length along the second side of the adhesive layer toward the center of the roll.

6. The assembly of claim 5, wherein the protective film layer begins at the beginning portion and extends the first length along the first side of the adhesive layer, the first length equaling an entire length of the first side of the adhesive layer from the beginning portion to the end of the adhesive layer disposed near the center of the roll.

7. The assembly of claim 1, wherein the adhesive layer, the protective film layer, and the cover layer are wrapped around a core member having a central axis at the center of the roll.

8. An assembly, comprising:
an adhesive layer;
a protective film layer, which includes a first film surface that is permanently attached to a first side of the adhesive layer along a first length of the first side of the adhesive layer, and a second film surface that is non-adhesive and that is disposed on an opposite side of the protective film layer as the first film surface; and
a cover layer, which includes a first cover surface that is permanently attached to a second side of the adhesive layer along a second length of the second side of the adhesive layer, and a second cover surface that is non-adhesive and that is disposed on an opposite side of the cover layer as the first cover surface;
wherein the adhesive layer, the protective film layer, and the cover layer are wound in a roll and the first length extends from an outside end portion of the roll along a plurality of layers of the adhesive layer wound around a center of the roll, and the second length extends from the outside end portion of the roll and ends slightly beyond an outside layer of the plurality of layers;
wherein the second side of the adhesive layer faces outwardly from a center of the roll;
wherein the cover layer, a portion of the adhesive layer that is permanently attached to the cover layer, and a portion of the protective film layer that is permanently attached to the portion of the adhesive layer form a cover having opposite exterior sides that are non-adhesive; and
wherein when the adhesive layer, the protective film layer, and the cover layer are wound in the roll, the cover extends continuously along the second length to cover an exterior of the roll.

9. The assembly of claim 8, wherein the opposite exterior sides of the cover that are non-adhesive are the second film surface and the second cover surface.

10. The assembly of claim 8, wherein:
a beginning portion of the assembly is disposed at the exterior of the roll;
an end of the assembly is disposed at an interior of the roll near the center of the roll; and
the cover of the assembly begins at the beginning portion and extends the second length toward the center of the roll.

11. The assembly of claim 10, wherein:
the cover including the cover layer ends at a distance of the second length from the beginning portion; and
the protective film layer permanently attached to the adhesive layer continues to extend from a point at the distance of the second length from the beginning portion until reaching the end of the assembly disposed near the center of the roll.

12. A method, comprising:
providing a protective film layer that is permanently attached to a first side of an adhesive layer along a first length of the first side of the adhesive layer, the protective film layer including an exposed protective surface that is non-adhesive;
providing a cover layer that is permanently attached to a second side of the adhesive layer along a second length of the second side of the adhesive layer, which is less than the first length, the cover layer including an exposed cover surface that is non-adhesive;
providing the protective film layer, the cover layer, and the adhesive layer in a wound roll in which the second side of the adhesive layer faces outwardly from a center of the roll and the cover layer is disposed at an exterior end portion of the roll, wherein the first length extends from the exterior end portion of the roll along a plurality of layers of the adhesive layer wound around the center of the roll, and the cover layer extends the second length from the exterior end portion of the roll and ends slightly beyond an outside layer of the plurality of layers, an exposed adhesive surface of the adhesive layer being exposed after the cover layer and along the plurality of layers of the adhesive layer wound around the center of the roll;
unrolling the roll starting with the exterior end portion of the roll; and
exposing the exposed adhesive surface of the adhesive layer at the second side of the adhesive layer after the first length of the cover layer is unrolled from the roll;
wherein when the adhesive layer is wound in the roll, the exposed cover surface of the cover layer that is non-adhesive faces outwardly from the center of the roll, and the cover layer extends continuously along the second length to cover the exposed adhesive surface at an exterior of the roll.

13. The method of claim 12, further comprising adhering the exposed adhesive surface to a surface to be protected while continuing to unroll the roll.

14. The method of claim 12, further comprising rewinding the roll and re-covering the exposed adhesive surface of the adhesive layer with the cover layer.

15. The method of claim 12, wherein a first surface of the cover layer is permanently attached to the second side of the adhesive layer and a second surface of the cover layer, which is opposite to the first surface, is the exposed cover surface that is non-adhesive.

16. The method of claim 12, further comprising detaching the cover layer from the roll when the cover layer is unrolled.

17. The method of claim 16, wherein:
detaching the cover layer includes detaching
the cover layer, a portion of the adhesive layer, and a portion of the protective film layer that form a detached cover having opposite sides that are both non-adhesive.

18. The method of claim 17, further comprising disposing an end portion of the detached cover between an unrolled end portion of the protective film layer that is permanently attached to the first side of the adhesive layer and an adjacent exposed adhesive surface of the adhesive layer that is rolled on the roll.

19. The method of claim 18, further comprising re-covering the exposed adhesive surface of the adhesive layer with the detached cover.

\* \* \* \* \*